US012718120B2

(12) United States Patent
Rawat et al.

(10) Patent No.: US 12,718,120 B2
(45) Date of Patent: Aug. 25, 2026

(54) RECOMMENDING MODEL CONTRIBUTIONS BASED ON FEDERATED LEARNING LINEAGE

(71) Applicant: International Business Machines Corporation, Armonk, NY (US)

(72) Inventors: Ambrish Rawat, Dublin (IE); Mark Purcell, Naas (IE); Stefano Braghin, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1127 days.

(21) Appl. No.: 17/450,712

(22) Filed: Oct. 13, 2021

(65) Prior Publication Data

US 2023/0110975 A1 Apr. 13, 2023

(51) Int. Cl.
*G06N 5/04* (2023.01)
*G06F 16/2452* (2019.01)
*G06N 20/00* (2019.01)

(52) U.S. Cl.
CPC ......... *G06N 5/04* (2013.01); *G06F 16/24522* (2019.01); *G06N 20/00* (2019.01)

(58) Field of Classification Search
CPC ..... G06N 5/04; G06N 20/00; G06F 16/24522
See application file for complete search history.

(56) References Cited

U.S. PATENT DOCUMENTS 9,979,606 B2 5/2018 Gupta
10,409,863 B2 9/2019 Bequet
10,581,881 B2 3/2020 Muddu
10,650,045 B2 5/2020 Bequet
10,686,804 B2 6/2020 Yadav
10,740,076 B2 8/2020 Bequet
10,740,395 B2 8/2020 Bequet
10,761,839 B1 * 9/2020 Migoya .................... G06F 8/33
11,238,849 B1 * 2/2022 Mimassi ................ G10L 15/07
11,537,506 B1 * 12/2022 Dasgupta ........... G06F 11/1476

(Continued)

OTHER PUBLICATIONS

Chen, et al. (Dec. 14, 2019) “Federated Meta-Learning with Fast Convergence and Efficient Communication,” arXiv:1802.07876v2 (Year: 2019).*

(Continued)

*Primary Examiner* — David Yi
(74) *Attorney, Agent, or Firm* — Rakesh Roy

(57) ABSTRACT

A computer-implemented method, a computer program product, and a computer system for recommending model contributions based on federated learning lineage. The computer system retrieves information of model checkpoints. The computer system trains data analytic models for monitoring activities of training rounds in a federated learning system, based on the information of the model checkpoints. The computer system sends to a user summary statistics of the model checkpoints. The computer system receives from the user natural language instructions of modifying a federated learning plan for future training rounds in the federated learning system. The computer system translates the natural language instructions into updates for the federated learning system. The computer system forwards the updates to the federated learning system.

20 Claims, 6 Drawing Sheets

(56) References Cited

U.S. PATENT DOCUMENTS

| | | | | |
|---|---|---|---|---|
| 2018/0052878 | A1 | 2/2018 | Seetharaman | |
| 2020/0151611 | A1* | 5/2020 | McGavran | G09B 29/102 |
| 2020/0349415 | A1* | 11/2020 | Raju | G06F 40/20 |
| 2021/0073639 | A1* | 3/2021 | Jakkam Reddi | G06N 3/084 |
| 2021/0081841 | A1* | 3/2021 | Sikka | G06N 3/045 |
| 2021/0174246 | A1* | 6/2021 | Triplet | G06N 7/01 |
| 2022/0405651 | A1* | 12/2022 | Knuesel | G06N 20/20 |
| 2022/0414464 | A1* | 12/2022 | Krishnaswamy | G06N 3/047 |
| 2023/0036702 | A1* | 2/2023 | Reisser | G06N 3/02 |
| 2023/0177356 | A1* | 6/2023 | Choi | G06F 16/901<br>706/46 |
| 2024/0386015 | A1* | 11/2024 | Crabtree | G06F 16/9024 |

OTHER PUBLICATIONS

Ammad-Ud-Din et al., "Federated Collaborative Filtering for Privacy-Preserving Personalized Recommendation System", arXiv:1901.09888v1 [cs.IR] Jan. 29, 2019, Apr. 24, 2021, 12 pages.

Atli, et al., "WAFFLE: WAFFLE: Watermarking in Federated Learning", arXiv:2008.07298v2 [cs.CR] Feb. 15, 2021, 11 pages.

Disclosed Anonymously, "Anticipatory Product Development Using Design Suggestions", IP.com, IPCOM000252104D, Dec. 15, 2017, 34 pages.

Disclosed Anonymously, "Item recommendations for cache and synchronization of application stores", ip.com, IPCOM000257131D, Jan. 15, 2019, 32 pages.

Disclosed Anonymously, "Machine-Learning for Optimization of Software Parameters", IP.com, IPCOM000252023D, Dec. 13, 2017, 35 pages.

Lanter, David P., (1991) "Design of a Lineage Based Meta Data Base for GIS, Cartography and Geographic Information Systems" 18:4, 255 261, DOI: 10.1559/152304091783786718, Abstract, 4 pages.

Liu, et al. "Federated Unlearning." arXiv preprint arXiv:2012.13891 (2020), 12 pages.

Makhtar et al., "Predictive model representation and comparison: Towards data and predictive models governance," 2010 UK Workshop on Computational Intelligence (UKCI), Colchester, UK, 2010, 6 pages.

Mell et al., "The NIST Definition of Cloud Computing", National Institute of Standards and Technology U.S. Department of Commerce, Special Publication 800-145, Sep. 2011, 7 pages.

Missier et al., "Data Lineage Model for Taverna Workflows with Lightweight Annotation Requirements", Provenance and Annotation of Data and Processes, IPAW 2008, Lecture Notes in Computer Science, vol. 5272, Springer, Berlin, Heidelberg, 14 pages.

Qi et al., "Privacy-Preserving News Recommendation Model Learning", arXiv:2003.09592v3 [cs.IR] Oct. 8, 2020, 10 pages.

Rajendra et al,. "Lineage retrieval for scientific data processing: a survey", ACM Computing Surveys, vol. 37, Issue 1, Mar. 1, 2005, DOI:https doi.org /10.1145/1057977.1057978, abstract, 5 pages.

Sridhar, et al. "Model governance: Reducing the anarchy of production ML", 2018 USENIX Annual Technical Conference (USENIX ATC '18), <https://www.usenix.org/conference/atc18/presentation/sridhar>, Jul. 11-13, 2018 • Boston, MA, USA, 8 pages.

* cited by examiner

Workloads
90
91
92
93
94
95
96
Management
80
81
82
83
84
85
Virtualization
70
71
72
73
74
75
Hardware and Software
60
61
62
63
64
65
66
67
68

RECOMMENDING MODEL CONTRIBUTIONS BASED ON FEDERATED LEARNING LINEAGE

BACKGROUND

The present invention relates generally to federated learning, and more particularly to recommending model contributions based on federated learning lineage.

In general, a federated learning system performs data analytics or model training across a distributed set of clients which do not share data. In the federated learning system, in the beginning, a federated learning plan is laid out that specifies the necessary details for training an initial machine learning model. The federated learning plan may include details of client participation, optimization parameters, parameters for aggregation protocols, etc. After local training, participants or clients provide updates (e.g., model weights) to an aggregator, who fuses these updates from all participants or clients to create a new machine learning model. A federated learning system user often manually monitors different aspects of model training and client behavior in order to make recommendations for future use of the federated learning system.

SUMMARY

In one aspect, a computer-implemented method for recommending model contributions based on federated learning lineage is provided. The computer-implemented method includes retrieving, by a system for recommending model contributions, from a model lineage system, information of model checkpoints. The computer-implemented method further includes training, by the system for recommending model contributions, data analytic models for monitoring activities of training rounds in a federated learning system, based on the information of the model checkpoints. The computer-implemented method further includes sending to a user, by the system for recommending model contributions, summary statistics of the model checkpoints. The computer-implemented method further includes receiving, by the system for recommending model contributions, from the user, natural language instructions of modifying a federated learning plan for future training rounds in the federated learning system. The computer-implemented method further includes translating, by the system for recommending model contributions, the natural language instructions into updates for the federated learning system. The computer-implemented method further includes forwarding, by the system for recommending model contributions, the updates to the federated learning system.

In another aspect, a computer program product for recommending model contributions based on federated learning lineage is provided. The computer program product comprises a computer readable storage medium having program instructions embodied therewith, and the program instructions are executable by one or more processors. The program instructions are executable to: retrieve, by a system for recommending model contributions, from a model lineage system, information of model checkpoints; train, by the system for recommending model contributions, data analytic models for monitoring activities of training rounds in a federated learning system, based on the information of the model checkpoints; send to a user, by the system for recommending model contributions, summary statistics of the model checkpoints; receive, by the system for recommending model contributions, from the user, natural language instructions of modifying a federated learning plan for future training rounds in the federated learning system; translate, by the system for recommending model contributions, the natural language instructions into updates for the federated learning system; and forward, by the system for recommending model contributions, the updates to the federated learning system.

In yet another aspect, a computer system for recommending model contributions based on federated learning lineage is provided. The computer system comprises one or more processors, one or more computer readable tangible storage devices, and program instructions stored on at least one of the one or more computer readable tangible storage devices for execution by at least one of the one or more processors. The program instructions are executable to retrieve, by a system for recommending model contributions, from a model lineage system, information of model checkpoints. The program instructions are further executable to train, by the system for recommending model contributions, data analytic models for monitoring activities of training rounds in a federated learning system, based on the information of the model checkpoints. The program instructions are further executable to send to a user, by the system for recommending model contributions, summary statistics of the model checkpoints. The program instructions are further executable to receive, by the system for recommending model contributions, from the user, natural language instructions of modifying a federated learning plan for future training rounds in the federated learning system. The program instructions are further executable to translate, by the system for recommending model contributions, the natural language instructions into updates for the federated learning system. The program instructions are further executable to forward, by the system for recommending model contributions, the updates to the federated learning system.

DETAILED DESCRIPTION

Embodiments of the present invention disclose a system for recommending model contributions based on federated learning lineage. The disclosed system helps a domain expert make recommendations to a federated learning plan. The disclosed system is trained to automatically learn useful insights from different checkpoints across the training runs in a federated learning system; thus, a domain expert can interact with the disclosed system with minimal knowledge of data science concepts. The disclosed system leverage model lineage information for the automatic update of model training in a federated learning system.

Figure 1:
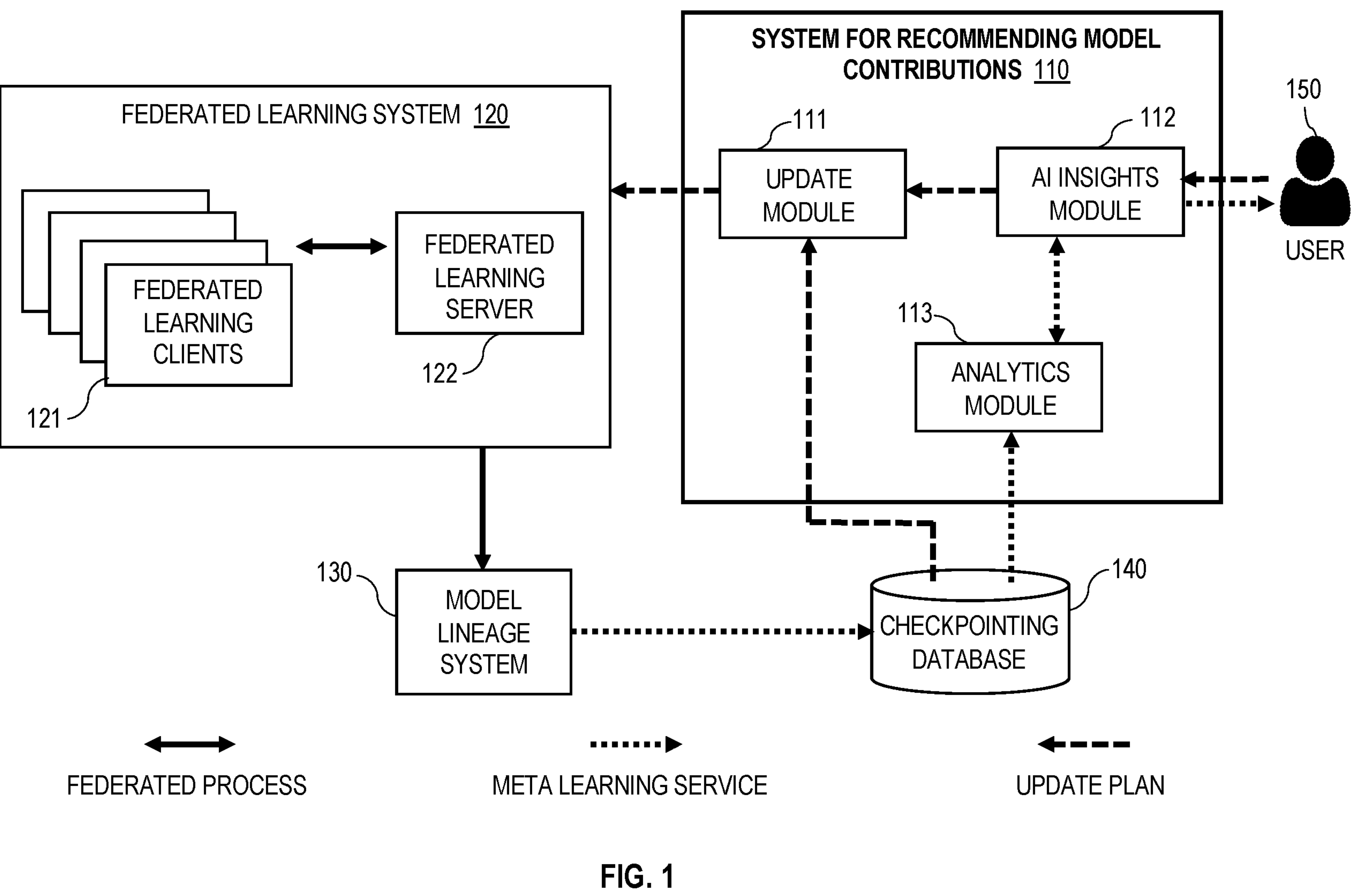
FIG. 1 is a systematic diagram illustrating a system for recommending model contributions based on federated learning lineage, in accordance with one embodiment of the present invention.

FIG. 1 is a systematic diagram illustrating system 110 for recommending model contributions based on federated learning lineage, in accordance with one embodiment of the present invention. System 110 for recommending model contributions takes data of federated learning lineage as input. Model lineage system 130 stores the data of federated learning lineage in checkpointing database 140.

Model lineage system 130 receives the following as input: interim or final models from federated learning server 122 in federated learning system 120 and model updates from federated learning clients 121 in federated learning system 120. Based on the input, model lineage system 120 generates output: individual records of each stage of the federated learning process. Model lineage system 120 records or checkpoints the input and the output in checkpointing database 140.

System 110 for recommending model contributions outputs recommendations to user 150 for improving a federated learning plan, based on the data of federated learning lineage. System 110 for recommending model contributions allows user 150 to implement the recommendations for future training rounds in federated learning system 120. The recommendations may be, for example, at least one of the following forms: steps to unlearn the effect of any client during model training, flagging clients who are unreliable, and improving learning parameters for efficient training in the federated learning.

System 110 for recommending model contributions includes analytics module 113. Analytics module 113 includes machine learning models that predict client behaviors; for example, the machine learning models flag malicious users or predict the influence of a federated learning client over different checkpoints. In meta learning, analytics module 113 takes data of checkpointing database 140 as input. The input to analytics module 113 includes but not limited to the following examples: model checkpoints across both model update and broadcasting steps, a map between checkpoints and federated learning client IDs (identifications), and federated learning client IDs during different training rounds (if applicable). In meta learning, analytics module 113 outputs, for example, summary of client contributions, training accuracy across different client contributions, and client clusters signifying their roles.

System 110 for recommending model contributions further includes AI (artificial intelligence) insights module 112. AI insights module 112 takes the output of analytic module 113 and generates natural language descriptions for user 150. Also, AI insights module 112 translates natural language queries from user 150 and requests analytics module 113 to train appropriate machine learning models for meta learning (or meta learning models). For example, the meta learning models may be a linear classifier or a deep learning model; if user 150 wants to know about the effect of increasing a learning rate from past federated learning runs, a meta learning models may be a regression model; if user 150 wants to know which optimizer has worked best in previous runs, a meta learning models may be a classifier.

System 110 for recommending model contributions further includes update module 111. Update module 111 is a meta learner; given a history of checkpoints provided by checkpointing database 140 and the recommendation from user 150, update module 111 predicts the hyperparameter changes for the federated learning plan.

System 110 for recommending model contributions is implemented on one or more computing devices or servers. A computing device or server is described in more detail in later paragraphs with reference to FIG. 4. System 110 for recommending model contributions may be implemented in a cloud computing environment. The cloud computing environment is described in more detail in later paragraphs with reference to FIG. 5 and FIG. 6.

Figure 2:
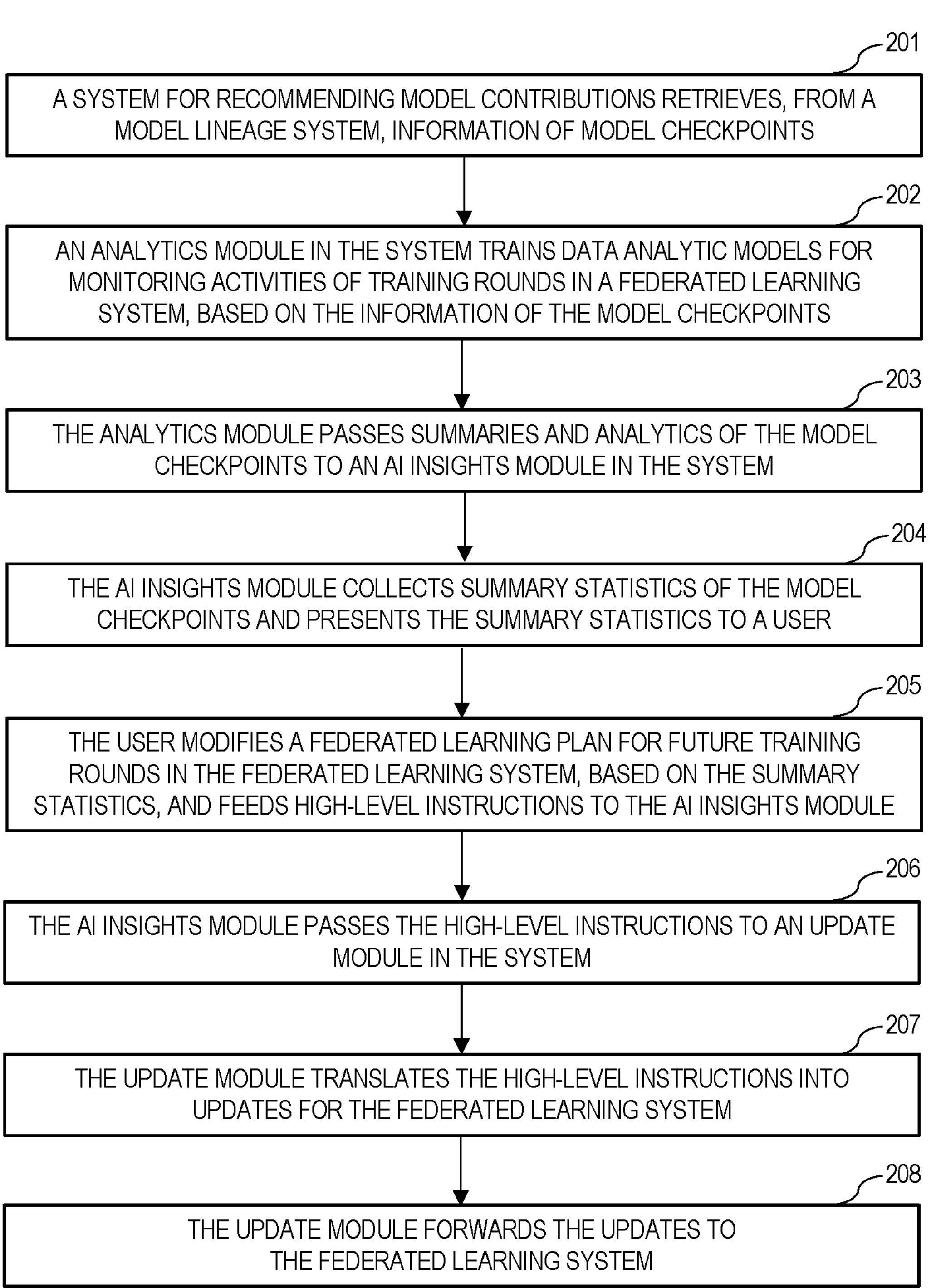
FIG. 2 is a flowchart showing operational steps of recommending model contributions based on federated learning lineage, in accordance with one embodiment of the present invention.

FIG. 2 is a flowchart showing operational steps of recommending model contributions based on federated learning lineage, in accordance with one embodiment of the present invention. At step 201, a system for recommending model contributions retrieves, from a model lineage system, information of model checkpoints. The model lineage system sends the details for checkpointing to a checkpointing database. The details for checkpointing includes, for example, model checkpoints or information about which client IDs have contributed to a particular update. In the example shown in FIG. 1, model lineage system 130 sends the details for checkpointing to checkpointing database 140, and system 110 for recommending model contributions retrieves from checkpointing database 140 the details for checkpointing.

At step 202, an analytics module in the system for recommending model contributions trains data analytic models for monitoring activities of training rounds in a federated learning system, based on the information of the model checkpoints. A set of data analytic models are trained or updated for monitoring the activities over training rounds. For example, data analytic models are models of computing summary statistics for different checkpoints. In the example shown in FIG. 1, analytics module 113 in system 110 trains data analytic models based on data of checkpointing database 140.

At step 203, the analytics module passes summaries and analytics of the model checkpoints to an AI (artificial intelligence) insights module in the system. The required summaries and analytics are passed to a user dashboard (e.g., a graphical user interface for user interaction) in the AI insights module. For example, the required summaries and analytics may include performance metrics for last N checkpoints, where N can be configured through the user dashboard. In the example shown in FIG. 1, analytics module 113 passes the summaries and analytics to AI insights module 112.

At step 204, the AI insights module collects summary statistics of the model checkpoints and presents the summary statistics to a user. In the example shown in FIG. 1, AI insights module 112 collects the summary statistics and presents the summary statistics to user 150. Steps 201-204 are operational steps of meta learning.

At step 205, the user modifies a federated learning plan for future training rounds in the federated learning system, based on the summary statistics, and the user feeds high-level instructions of modifying the federated learning plan to the AI insights module. Based on the analysis observed via AI insights module, the user can modify the federated learning plan for future training rounds. The high-level instructions are natural language instructions; for example, a high-level instruction may be: to convert a federated learning system's state to a previous checkpoint, specify the number of participating clients, specify model training algorithm, etc. In the example shown in FIG. 1, user 150 modifies the federated learning plan and feeds the high-level instructions to AI insights module 112.

At step 206, the AI insights module passes the high-level instructions to an update module in the system. In the example shown in FIG. 1, AI insights module 112 passes the high-level instructions to update module 111.

At step 207, the AI insights module translates the high-level instructions into updates for the federated learning system. The updates include, for example, model-based decisions based on previous checkpoints. For example, the AI insights module translates natural language instructions such as "reduce the learning rate for all clients" to tangible (mathematical) updates such "learning rate=learning rate/10 for all clients". In the example shown in FIG. 1, AI insights module 112 translates the high-level instructions.

At step 208, the update module forwards the updates to the federated learning system. In the example shown in FIG. 1, update module 111 forwards the updates to federated learning system 120. Steps 205-208 are operational steps of updating the federated learning plan.

Figure 3:
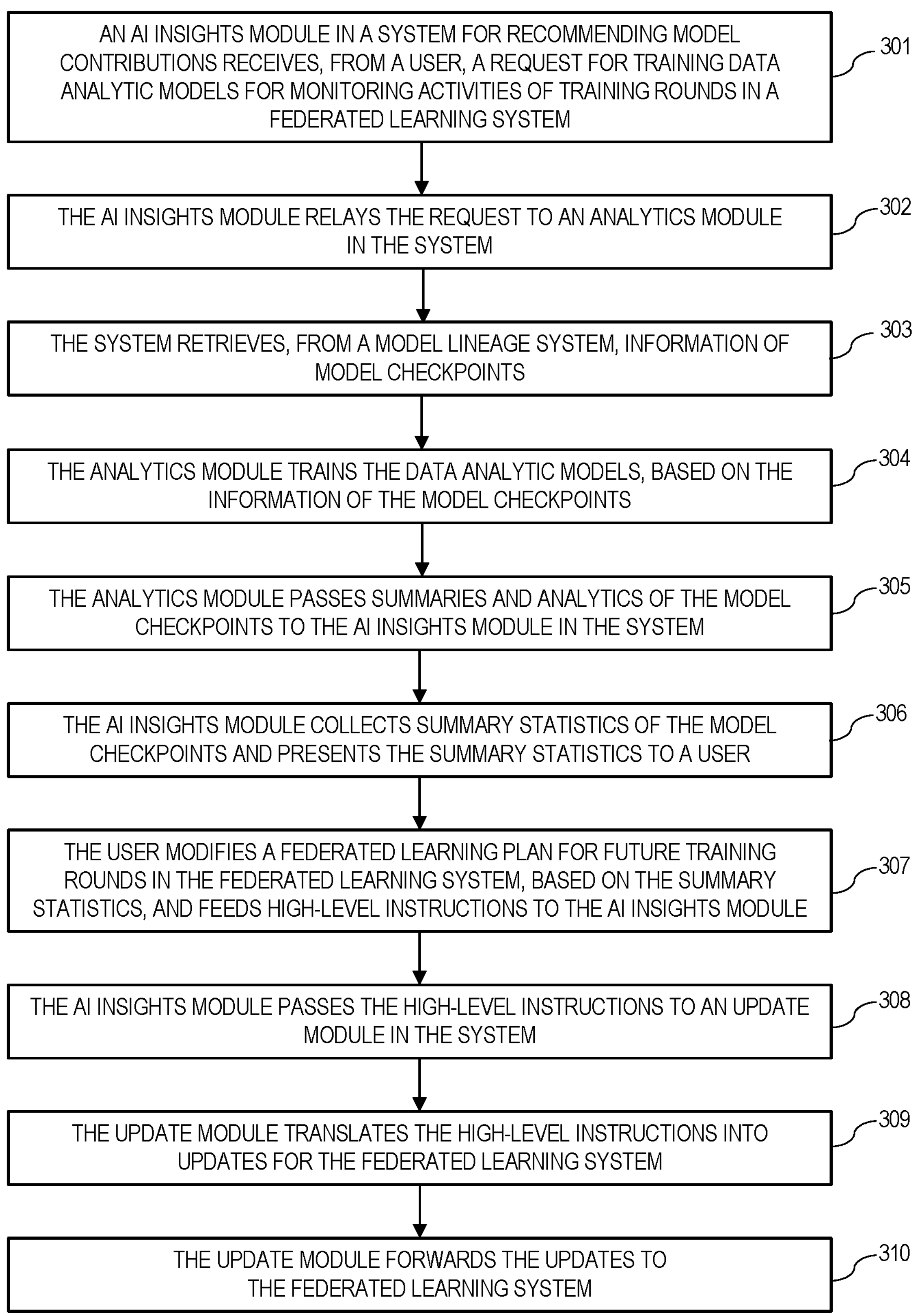
FIG. 3 is a flowchart showing operational steps of recommending model contributions based on federated learning lineage, in accordance with another embodiment of the present invention.

FIG. 3 is a flowchart showing operational steps of recommending model contributions based on federated learning lineage, in accordance with another embodiment of the present invention. At step 301, an AI insights module in a system for recommending model contributions receives, from a user, a request for training data analytic models for monitoring activities of training rounds in a federated learning system. In the example shown in FIG. 1, AI insights module 112 receives, from a user 150, the request for training the data analytic models.

At step 302, the AI insights relays the request to an analytics module in the system. In the example shown in FIG. 1, AI insights module 112 relays the request to analytics module 113. The operational steps presented in FIG. 3 further include steps 303-310. Steps 303-310 in FIG. 3 are identical to steps 201-208 in FIG. 2, respectively; therefore, for the description of steps 303-310, the description of steps 201-208 can be referenced. The description of steps 201-208 is presented in previous paragraphs with reference to FIG. 2.

Figure 4:
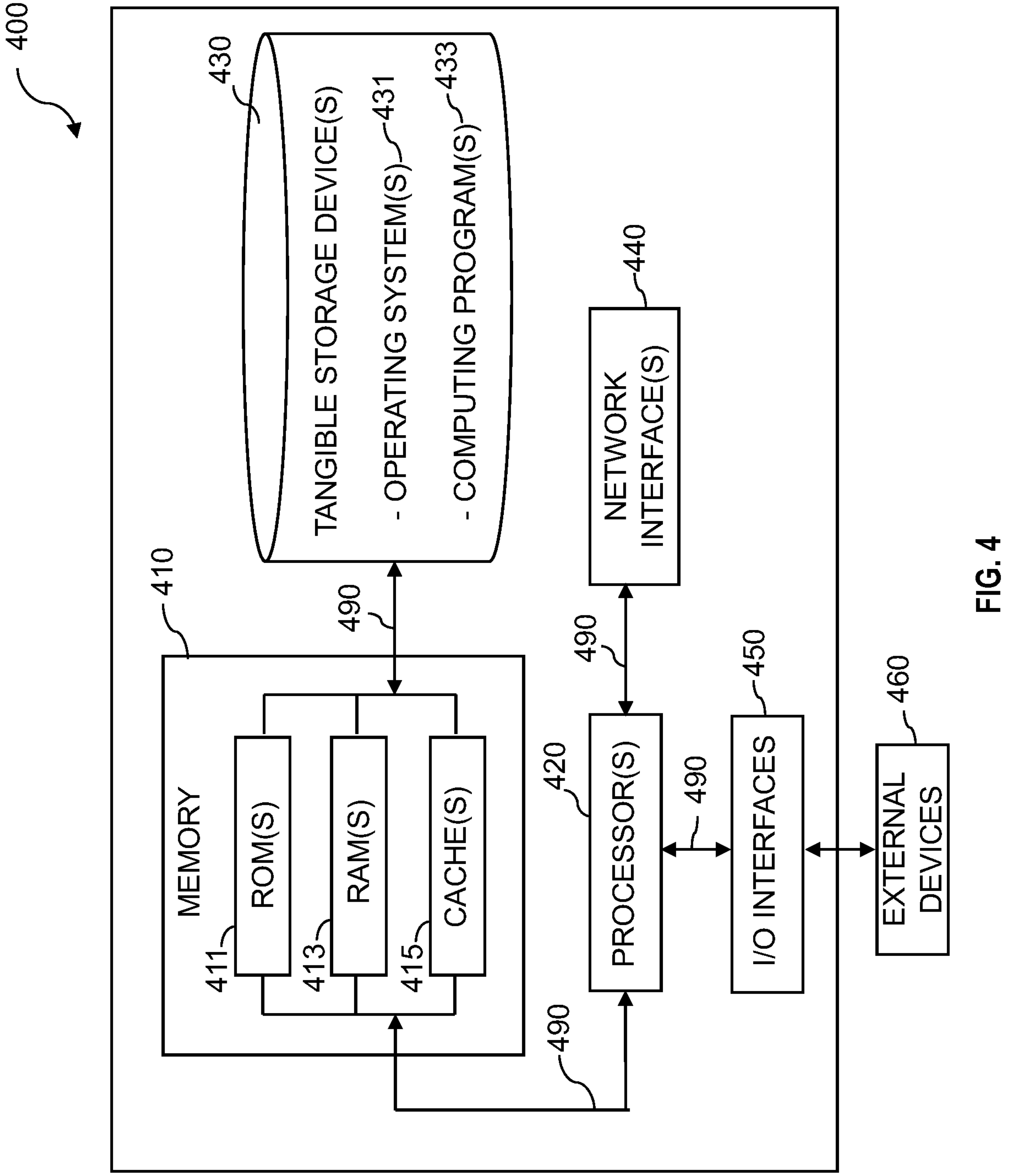
FIG. 4 is a diagram illustrating components of a computing device or server, in accordance with one embodiment of the present invention.

FIG. 4 is a diagram illustrating components of a computing device or server 400, in accordance with one embodiment of the present invention. It should be appreciated that FIG. 4 provides only an illustration of one implementation and does not imply any limitations; different embodiments may be implemented.

Referring to FIG. 4, computing device diagram illustrating components of a computing device or server 400 includes processor(s) 420, memory 410, and tangible storage device(s) 430. In FIG. 4, communications among the above-mentioned components of computing device diagram illustrating components of a computing device or server 400 are denoted by numeral 490. Memory 410 includes ROM(s) (Read Only Memory) 411, RAM(s) (Random Access Memory) 413, and cache(s) 415. One or more operating systems 431 and one or more computer programs 433 reside on one or more computer readable tangible storage device(s) 430.

Computing device diagram illustrating components of a computing device or server 400 further includes I/O interface(s) 450. I/O interface(s) 450 allows for input and output of data with external device(s) 460 that may be connected to computing device diagram illustrating components of a computing device or server 400. Computing device diagram illustrating components of a computing device or server 400 further includes network interface(s) 440 for communications between computing device diagram illustrating components of a computing device or server 400 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
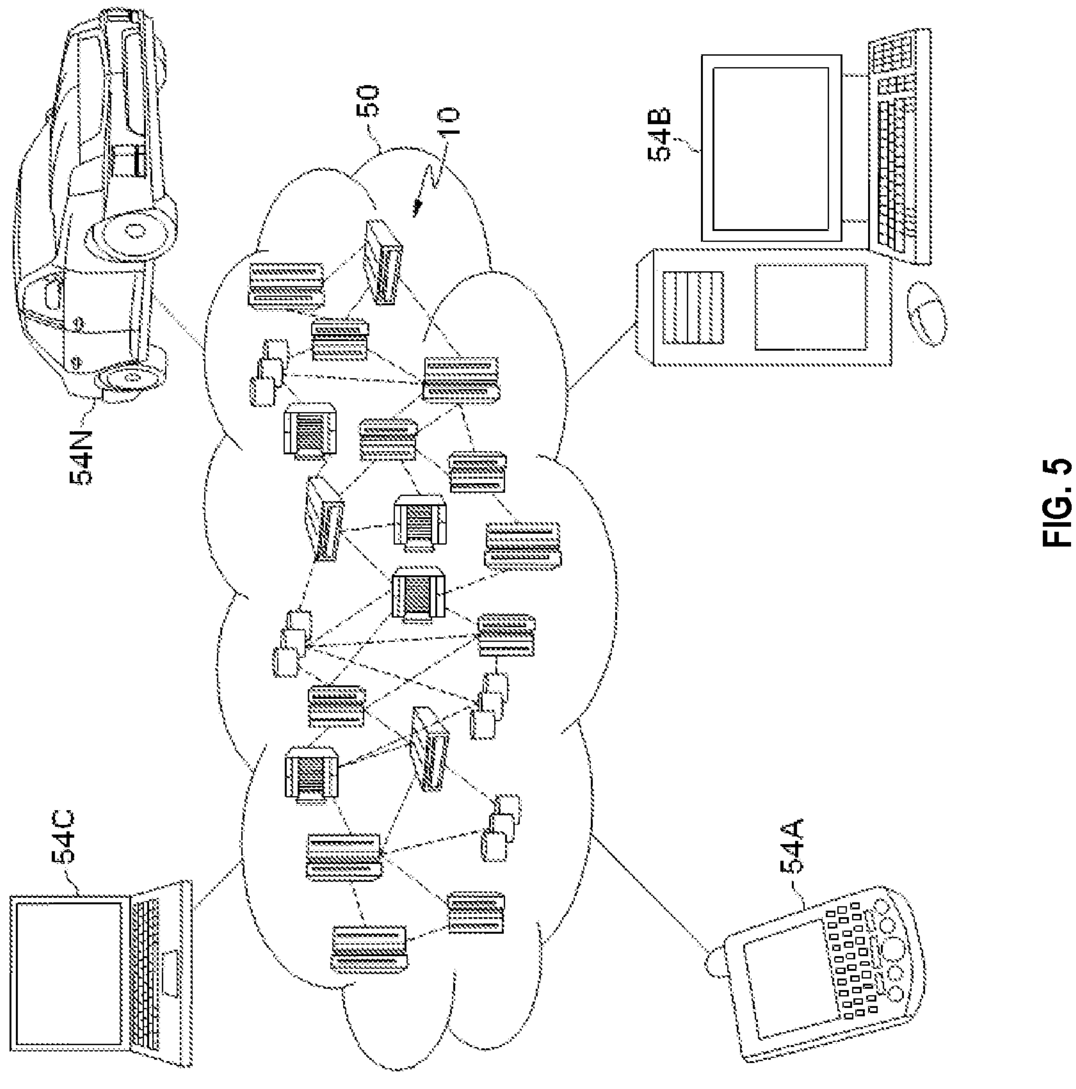
FIG. 5 depicts a cloud computing environment, in accordance with one embodiment of the present invention.

Referring now to FIG. 5, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 6:
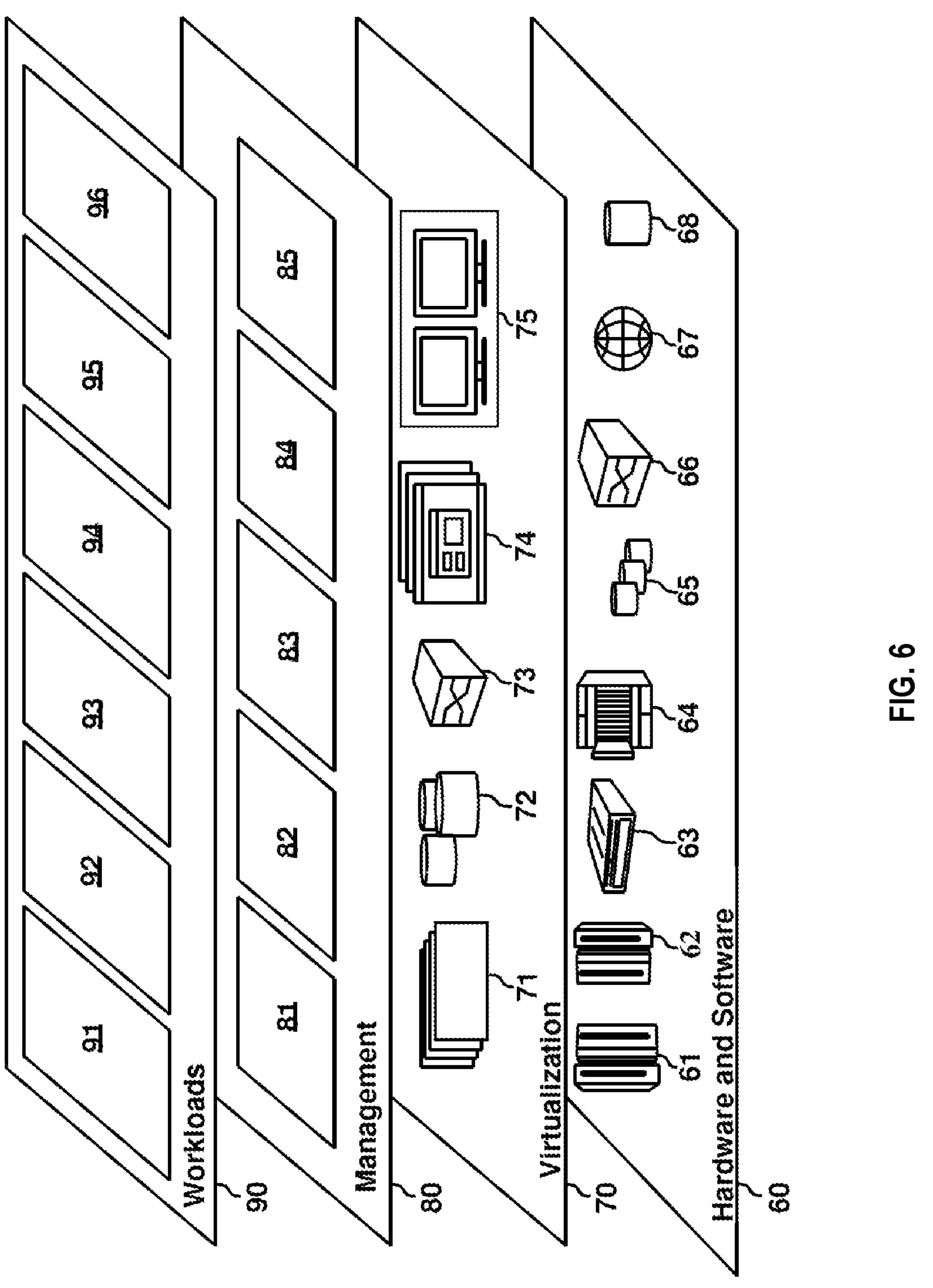
FIG. 6 depicts abstraction model layers in a cloud computing environment, in accordance with one embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of recommending model contributions based on federated learning lineage.

What is claimed is:

1. A computer-implemented method comprising:

retrieving, by a system for recommending model contributions, model lineage checkpoints associated with a federated learning plan in a federated learning system including one or more federated learning servers and one or more federated learning clients, wherein the model lineage checkpoints include periodically-stored client updates from the one or more federated learning clients, wherein a respective periodically-stored client update identifies at least one federated learning client that contributed to the respective periodically-stored client update;

training, by the system for recommending the model contributions, data analytic models for monitoring activities of training rounds in the federated learning system, based on the model lineage checkpoints;

sending to a user, by the system for recommending the model contributions, summary statistics of the model lineage checkpoints;

receiving, by the system for recommending the model contributions, from the user, natural language instructions for modifying the federated learning plan for future training rounds in the federated learning system;

executing, by the system for recommending the model contributions, one or more meta-learners to receive and process a history of the model lineage checkpoints and the natural language instructions from the user to predict one or more hyperparameter modifications configured to modify the federated learning plan according to the natural language instructions from the user; and forwarding, by the system for recommending the model contributions, at least one update to the federated learning system, the at least one update including the one or more hyperparameter modifications for the federated learning plan according to the natural language instructions from the user.

2. The computer-implemented method of claim 1, further comprising:

modifying the federated learning plan based on the summary statistics of the model lineage checkpoints and recommendations by the system for recommending the model contributions.

3. The computer-implemented method of claim 1, further comprising:

receiving, by the system for recommending the model contributions, from the user, a request for training the data analytic models.

4. The computer-implemented method of claim 1, further comprising:

translating, by the system for recommending the model contributions, natural language queries from the user for training meta learning models.

5. The computer-implemented method of claim 1, further comprising:

translating, by the system for recommending the model contributions, summaries and analytics of the model lineage checkpoints to natural language descriptions for the user.

6. The computer-implemented method of claim 1, further comprising:

predicting, by the system for recommending the model contributions, hyperparameter modifications for the federated learning plan.

7. The computer-implemented method of claim 1, wherein the federated learning system includes a model lineage system that generates individual records of each stage of the federated learning plan for the model lineage checkpoints, wherein the model lineage system records the model lineage checkpoints on a database.

8. A computer program product for recommending model contributions based on federated learning lineage, the computer program product comprising a computer readable storage medium having program instructions embodied therewith, the program instructions executable by one or more processors, the program instructions executable to:

retrieve, by a system for recommending the model contributions, model lineage checkpoints associated with a federated learning plan in a federated learning system including one or more federated learning servers and one or more federated learning clients, wherein the model lineage checkpoints include periodically-stored client updates from the one or more federated learning clients, wherein a respective periodically-stored client update identifies at least one federated learning client that contributed to the respective periodically-stored client update;

train, by the system for recommending the model contributions, data analytic models for monitoring activities of training rounds in the federated learning system, based on the model lineage checkpoints;

send to a user, by the system for recommending the model contributions, summary statistics of the model lineage checkpoints;

receive, by the system for recommending the model contributions, from the user, natural language instructions for modifying the federated learning plan for future training rounds in the federated learning system;

execute, by the system for recommending the model contributions, one or more meta-learners to receive and process a history of the model lineage checkpoints and the natural language instructions from the user to predict one or more hyperparameter modifications configured to modify the federated learning plan according to the natural language instructions from the user; and forward, by the system for recommending the model contributions, at least one update to the federated learning system, the at least one update including the one or more hyperparameter modifications for the federated learning plan according to the natural language instructions from the user.

9. The computer program product of claim 8, further comprising the program instructions executable to: modify the federated learning plan based on the summary statistics of the model lineage checkpoints and recommendations by the system for recommending the model contributions.

10. The computer program product of claim 8, further comprising the program instructions executable to:

receive, by the system for recommending the model contributions, from the user, a request for training the data analytic models.

11. The computer program product of claim 8, further comprising the program instructions executable to:

translate, by the system for recommending the model contributions, natural language queries from the user for training meta learning models.

12. The computer program product of claim 8, further comprising the program instructions executable to:

translate, by the system for recommending the model contributions, summaries and analytics of the model lineage checkpoints to natural language descriptions for the user.

13. The computer program product of claim 8, further comprising program instructions executable to:

predict, by the system for recommending the model contributions, hyperparameter modifications for the federated learning plan.

14. The computer program product of claim 8, wherein the federated learning system includes a model lineage system that generates individual records of each stage of the federated learning plan for the model lineage checkpoints, wherein the model lineage system records the model lineage checkpoints on a database.

15. A computer system for recommending model contributions based on federated learning lineage, the computer system comprising:

one or more processors, one or more computer readable tangible storage devices, and program instructions stored on at least one of the one or more computer readable tangible storage devices for execution by at least one of the one or more processors, the program instructions executable to:

retrieve, by a system for recommending the model contributions, model lineage checkpoints associated with a federated learning plan in a federated learning system including one or more federated learning servers and one or more federated learning clients, wherein the model lineage checkpoints include periodically-stored client updates from the one or more federated learning clients, wherein a respective periodically-stored client update identifies at least one federated learning client that contributed to the respective periodically-stored client update;

train, by the system for recommending the model contributions, data analytic models for monitoring activities of training rounds in the federated learning system, based on the model lineage checkpoints;

send to a user, by the system for recommending the model contributions, summary statistics of the model lineage checkpoints;

receive, by the system for recommending the model contributions, from the user, natural language instructions for modifying the federated learning plan for future training rounds in the federated learning system;

execute, by the system for recommending the model contributions, one or more meta-learners to receive and process a history of the model lineage checkpoints and the natural language instructions from the user to predict one or more hyperparameter modifications configured to modify the federated learning plan according to the natural language instructions from the user; and forward, by the system for recommending the model contributions, at least one update to the federated learning system, the at least one update including the one or more hyperparameter modifications for the federated learning plan according to the natural language instructions from the user.

16. The computer system of claim 15, further comprising the program instructions executable to: modify the federated learning plan based on the summary statistics of the model lineage checkpoints and recommendations by the system for recommending the model contributions.

17. The computer system of claim 15, further comprising the program instructions executable to:

receive, by the system for recommending the model contributions, from the user, a request for training the data analytic models.

18. The computer system of claim 15, further comprising the program instructions executable to:

translate, by the system for recommending the model contributions, natural language queries from the user for training meta learning models.

19. The computer system of claim 15, further comprising the program instructions executable to:

translate, by the system for recommending the model contributions, summaries and analytics of the model lineage checkpoints to natural language descriptions for the user.

20. The computer system of claim 15, further comprising program instructions executable to:

predict, by the system for recommending the model contributions, hyperparameter modifications for the federated learning plan.

* * * * *